United States Patent [19]

Esparza

[11] Patent Number: 4,653,195
[45] Date of Patent: Mar. 31, 1987

[54] FLAME CUTTING TEMPLATE

[76] Inventor: Joe O. Esparza, 21435 Park Green, Katy, Tex. 77450

[21] Appl. No.: 754,634

[22] Filed: Jul. 15, 1985

[51] Int. Cl.⁴ .............................................. B23K 7/10
[52] U.S. Cl. ...................................... 33/529; 33/562; 266/64
[58] Field of Search ...................... 33/529, 562; 228/7, 228/56.5; 266/58, 64, 70; 137/318; 138/97

[56] References Cited

U.S. PATENT DOCUMENTS

| | | | |
|---|---|---|---|
| 647,996 | 4/1900 | Smith | 138/97 X |
| 3,209,459 | 10/1965 | Fish, Jr. | 33/529 X |
| 3,944,194 | 3/1976 | Robinson | 266/64 |

Primary Examiner—William D. Martin, Jr.

[57] ABSTRACT

A reusable template is disclosed herein for use in cutting pipe and other related applications in conjunction as a guide for an oxygen cutting torch. The template, as described in a preferred embodiment as a pipe template, has one or more contour ends so configured that after the branch pipe is cut it will fit flush against the external surface of a header pipe at the desired angle determined by the configuration of the contour end. The template is made of oxidation resistant material, with an alloy content sufficient to produce refractory oxides when heated by a flame, thus preventing the template from being cut by the oxygen cutting torch. The template is held in place over or on the workpiece or pipe by means well known in the art. The contour end or shape of the template is used as a guide for the nozzle of a standard oxygen cutting torch. Since the template is made of oxidation resistant material, the torch will cut the workpiece or pipe in the configuration of the contour of the template without destroying the template.

2 Claims, 13 Drawing Figures

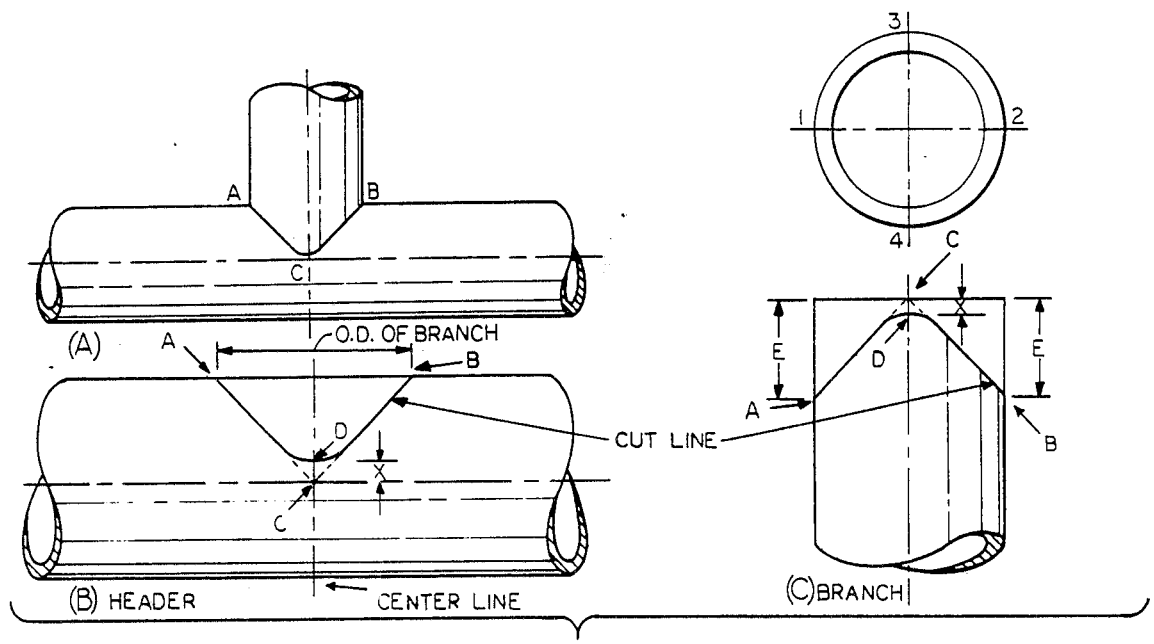
FIG. 1 (PRIOR ART)
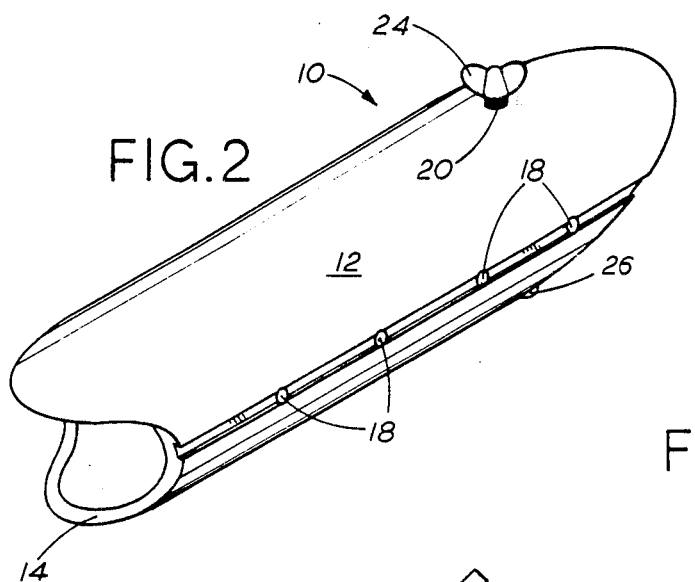
FIG. 2
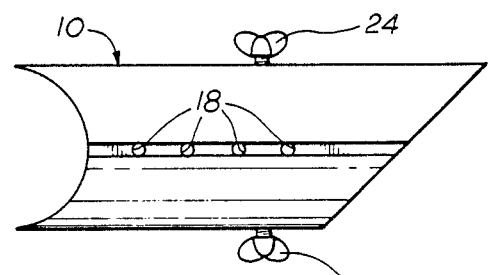
FIG. 2A
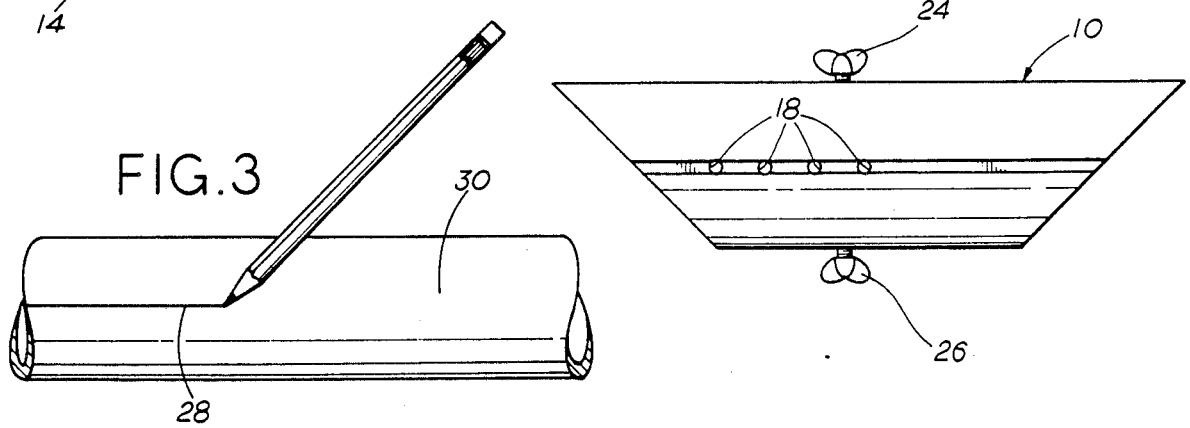
FIG. 3
FIG. 2B

FLAME CUTTING TEMPLATE

BACKGROUND OF THE INVENTION

1. Field of the Invention

This invention relates to templates and more particularly to a reusable template to be used as a guide in conjunction with an oxygen cutting torch.

2. Description of the Prior Art

The problem of accurately cutting intricate designs and patterns out of steel plate, pipe, tubing, bar stock, etc. in a minimum amount of time has plagued the welding and pipe fitting industry for years. A considerable amount of time is always spent laying out the design or cut lines prior to the actual cutting process. With respect to pipes, due to the fact that pipes have curved surfaces, it becomes an even more difficult and time consuming task to mark and cut the respective surfaces of the feeder and header pipes so that they will fit together in an accurate flush connection with their respective surfaces with respect to the angle desired between the two pipes. Naturally, as the angle changes between the header and feeder pipes, the configuration of the respective surfaces to be cut also changes.

The most widely used method of accurately joining two pipes together is to first draw on each respective pipe the area that needs to be cut out for any particular angular configuration between the respective pipes. The defacto standard procedure currently used is more fully discussed in "The Pipe Fitter's and Pipe Welders Handbook" written by Thomas W. Franklin and published by the Bruce Publishing Company. The layout equipment usually includes a square, a level, a wrap around, a strip of paper, and a piece of soap stone or chalk. Referring to FIG. 1, the usual layout procedure for constructing a T-branch is illustrated by way of example. To layout the header, one places a wrap around on the pipe at the center of the branch. A straight line is drawn around the pipe with soap stone or chalk, using the wrap around as a guide. Next, the center line is divided into four equal parts by a procedure well known in the art. A straight line, about ten inches long, is then drawn on the pipe at each quarter mark. These lines are then numbered as shown in the figure, with line number 3 on top, number 4 on the bottom and numbers 1 and 2 on the sides. Marks A and B, as shown in the figure, are then marked off with soap stone on line 3 on each side of the center line. The distance from A and B to the center is equal to one half of the outside diameter of the branch. Point C will be located at the intersection of the center line and lines 1 and 2. A wrap around is then placed on the pipe and lined up with point A and point C on lines 1 and 2. These points are then connected with a chalk line. The wrap around is next lined up with points C, B, and C and connected with a chalk line. Sometimes a pointed cut at point C is not desired. For a rounded cut, one locates point D. The distance from point C to point D is equal to two times the thickness of the pipe wall. A chalk line is then drawn by free hand connecting point D with the lines from A and B. The cut is made along these lines with the cutting tip at all times directed to the center of the pipe. Then, the edges are beveled to a forty five degree angle after the cut has been made.

Referring again to FIG. 1, the procedure for laying out the branch pipe for cutting is illustrated. Again, the surface of the branch pipe is divided into four equal parts by a procedure well known in the art. A straight line is then drawn from the end of the pipe at the quarter marks about six inches long. These lines, as shown in FIG. 1 (C), are numbered with line number 3 on the top, number 4 on the bottom and numbers 1 and 2 on the sides. Points A and B on lines 1 and 2 are then marked off with soap stone, the distance from A and B to the end of the pipe being equal to one half of the outside diameter of the pipe, which is noted as distance E.

A wrap around is then placed on the pipe and lined up with points A and C on lines 3 and 4 at the end of the pipe. These points are then connected with a chalk line. The wrap around is then lined up with points C, B and C and a chalk line is drawn connecting these points again, for a rounded cut, point D is located. The distance from point C to point D is equal to two times the thickness of the pipe wall. A chalk line is then drawn by free hand connecting point D with the lines from A and B. The branch pipe is then cut with a cutting torch along these layout lines by using a radial cut, but the cut is not beveled.

Similar marking procedures are employed for laying out cut lines for: turns; laterals; Y connections; reducers including the concentric, eccentric, and two cut eccentric reducer; for blanking off pipe including the orange peel, and the bull plug; and the full size cross connection.

With respect to designs cut from plates, the design is usually first drawn on the plate prior to cutting. This also can be very time consuming depending on the design pattern.

Once can readily see that these layout procedures currently used for laying out cut lines is extremely time consuming and is responsible for the majority of the time used in cutting patterns and welding two pieces of pipe together at any angular configuration.

To reduce this layout time, templates or jigs have heretofore been developed. Various other schemes have also been devised for making plate, bar stock or pipe to be cut. Representative patents in the general area of this invention are U.S. Pat. Nos. 1,683,953 (Multiple Template); 1,915,924 (Notching Guide for Tubes); 2,155,705 (Adjustable Template Means); 3,128,560 (Pipe Templates and Methods of Cutting Pipe).

While the various methods and templates as discussed above, or variations of them, have been used extensively for laying out cut lines, they all have serious drawbacks. The major drawback is that the template must be placed accurately around the workpiece to be marked so that the cut line can be drawn in the right configuration. Considerable difficulty has been encountered in prior art devices especially in pipe templates due to the fact that the pipe to be marked may vary in diameter to such an extent as to seriously effect the gripping action of the template. Split templates were developed to overcome these problems, however, still considerable difficulty arises due to variations in pipe diameters and accurately drawing the correct configuration. Further, all the prior art templates must actually be placed on or around the work piece to be marked and secured in place before a cut line is drawn. The work piece still needs to be marked prior to cutting. This layout procedure still requires a considerable amount of time prior to actually cutting the work piece.

Consequently, a need exists for improvements in templates which will considerably reduce the amount of layout time.

SUMMARY OF THE INVENTION

The present invention provides a reusable template designed to satisfy the aforementioned needs not heretofore anticipated by the prior art. It is an object of the present invention to provide a reusable template that can be placed over the workpiece to be cut and used as a guide in conjunction with an oxygen cutting torch so that the marking procedure is entirely eliminated, thus saving a considerable amount of time. The template is made of oxidation resistant material, thus, it will not be destroyed in the cutting process.

To fully appreciate the novelty of the present invention, one must reconsider the fundamentals of the oxygen cutting process. Oxygen cutting is defined as a group of cutting processes wherein the severing or removing of materials is effected by means of a chemical reaction of oxygen with the base metal at elevated temperatures. Oxygen cutting is a means by which ferrous metal is sereved by a chemical reaction between the iron or its alloys in a confined high purity oxygen stream. A small area of the metal is preheated to the oxygen ignition temperature of the ferrous metal, and a stream of pure oxygen is impinged on the heated area. The oxygen rapidly oxidizes the metal in a narrow section, which becomes the kerf or gap as the molten oxide and metal are removed by the kinetic energy of the oxygen stream.

The process of oxygen cutting is based on the capacity of high purity oxygen to combine rapidly with iron that has been heated to the kindling temperature. Thus, when iron or steel is heated to its oxygen ignition temperature and brought into contact with high purity oxygen, the iron is rapidly oxidized.

The alloying elements which change iron to steel, when present in small amounts, are oxidized or dissolved in the slag without markedly interfering with the process of the cut. However, when alloying elements are present in appreciable amounts, this has a drastic effect on the oxygen cutting process in that it makes the steel more difficult if not impossible to cut by the oxygen cutting process. As the alloying materials, including carbon, increase, the oxidation rate decreases from that of pure iron. The oxidation of the iron in the alloy liberates a considerable amount of heat and produces iron oxides, which have melting points near the melting point of iron. However, the oxides of many of the alloying materials have a far higher melting point than that of iron. These oxides, which produce refractory material, shield the material in the kerf or gap to such an extent that fresh iron is not continuously exposed to the oxygen stream. Because of these factors, the rate of cutting is reduced as the alloying elements in the iron, which produce a high melting point, refractory oxides, increase.

The effect of alloying elements on the resistance of steel to oxygen cutting can be roughly evaluated as follows:

Carbon—Steels up to 0.25% can be cut without difficulty. Higher carbon steels are difficult to cut.

Manganese—Steels of about 14% manganese and 1.5% carbon are difficult to cut.

Chromium—Pure chromium reacts with oxygen only at very high temperatures. Steels up to 5% chromium are cut without much difficulty when the surface is clean. Higher chromium steels, such as 10% chromium steels are difficult to cut and require special techniques.

Nickel—Nickel steels are difficult to cut in the 18% nickel 8% carbon range and above.

Molybdenum—This element effects cutting about the same as chromium.

Tungsten—Cutting is difficult over 20%.

Copper—Cutting is difficult over 2%.

Aluminum—Cutting is difficult over 10%.

Thus, those ferrous metals, with high alloy content, produce refractory oxides when oxidized and impair the oxygen cutting process. Stated in another way, the standard oxygen cutting torch will not cut alloys of steel which produce refractory oxides when oxidized. Chromium irons, stainless steels and cast irons are examples of these materials.

A template made of any oxidation resistant material which produce refractory oxides when heated could have a contour defining the shape to be cut such that the template could be placed directly on the workpiece and used as a guide for the oxygen cutting torch which would be directed around the contour and cutting the workpiece in the exact configuration of the contour. Because the template is made of an oxidation resistant material, the template is not destroyed by the oxygen cutting torch and can be reused again in subsequent cutting operations thus totally eliminating the time consuming layout and mark up procedure currently used in the prior art. Stainless steel would be an excellent choice of material for a template because it is a very poor thermal conductor of heat, thus allowing one to hold the template in one's hand while cutting.

BRIEF DESCRIPTION OF THE DRAWINGS

The invention will be hereinafter more fully described with reference to the accompanying drawings in which:

FIG. 1 is an illustration of how cut lines are laid out on a header and branch pipe by prior art methods.

FIG. 2 is an isometric view of a pipe template according to the present invention.

FIG. 3 is an isometric view of a chalk line being drawn on a branch pipe.

DESCRIPTION OF THE PREFERRED EMBODIMENT(S)

Figure 5:
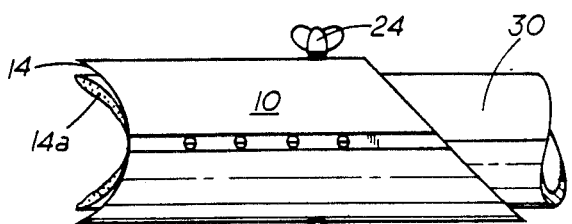
FIG. 5 is an isometric view of the template secured on the branch pipe after the cutting operation of FIG. 4.

The invention comprises a template made of oxidation resistant material in any shape or form to be placed over a workpiece to be cut and used as a cutting guide for the oxygen cutting torch.

From the foregoing broad description of the present invention, it would be apparent to one of ordinary skill in the art that the inventive concept embodied herein could be applied in a wide range of applications, including a template for cutting plates, pipes, tubing, bar stock, beams, structural members, patterns, etc.

However, the preferred embodiment will disclose the application of the foregoing broadly described inventive concept with respect to a pipe template.

Referring now to FIG. 2, a pipe template according to the present invention is illustrated generally as reference numeral 10 comprising a sleeve type member 12 having a first contoured end 14 and a second contoured end 16. Alignment holes 18 are positioned in alignment along one side of the template 10 to aid in positioning the template 10 onto the pipe to be cut.

The positioning of the alignment holes 18 is critical to the use of the template. The alignment holes 18 must be in alignment with the apex of the angle of the contour end so that the branch pipe, after it is cut, will be positioned correctly on the header pipe at the desired angle. Threaded holes 20 and 22 are positioned along the outer periphery of the sleeve type member 12. Thumb screws 24 and 26 are positioned into the threaded holes 20 and 22 to secure the template 10 to the pipe to be cut.

Figure 4:
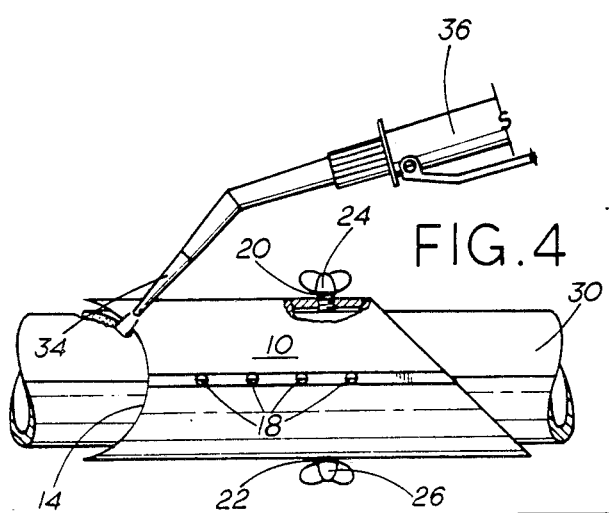
FIG. 4 is an isometric view of the template according to the present invention secured on a branch pipe with the branch pipe being cut along the contour end of the template.

FIGS. 3-11 illustrate the method of operation of the template. In FIG. 3 a center line 28 is drawn along the branch pipe 30. The template 10 is then slid over the branch pipe 30 with the alignment holes 18 in alignment with the center line 28. Since the alignment holes are in alignment with the apex of the contour end, and further since the alignment holes are in alignment with the center line drawn, the template is accurately positioned for the cut and the proper angle of cut can be achieved. The template 10 is then secured in place by the thumb screws 24 and 26 as illustrated in FIG. 4. The nozzle 34 of a cutting torch 36 is then directed along the periphery of the contour end 14 of the template 10 so as to cut the branch pipe 30 so that it too will have a contour end 14a similar to the first contour end 14.

Figure 7:
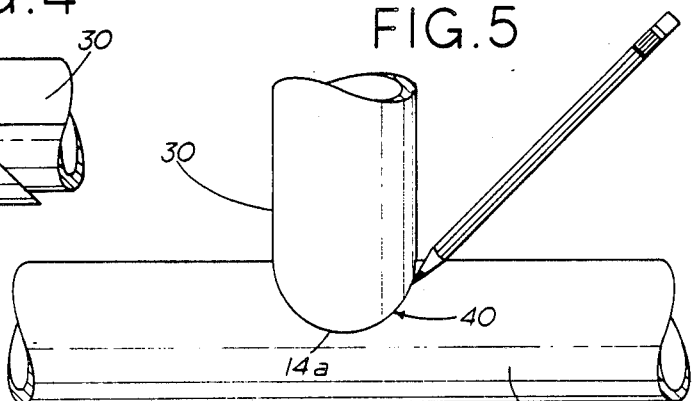
FIG. 7 is an isometric view illustrating the placement of the branch pipe onto the header pipe and a chalk line being drawn along the cut line.
Figure 6:
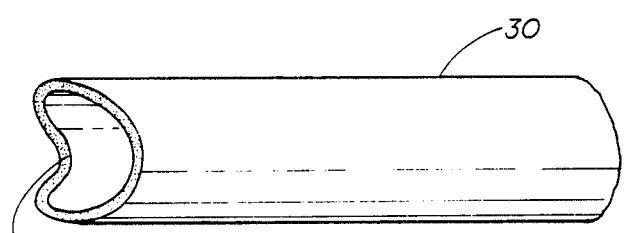
FIG. 6 is an isometric view of the branch pipe after the template has been removed illustrating the contour end that was cut.
Figure 8:
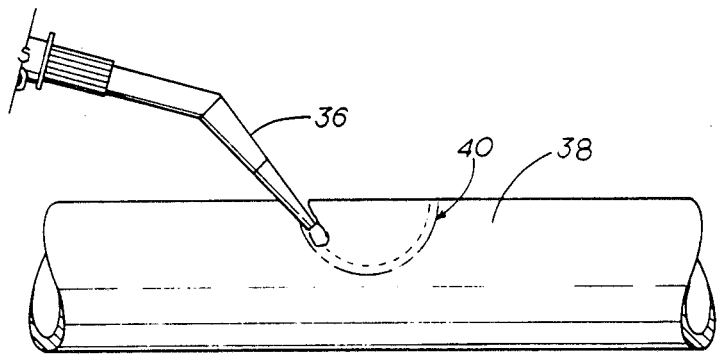
FIG. 8 is an isometric view illustrating the header pipe being cut along the chalk line.
Figure 9:
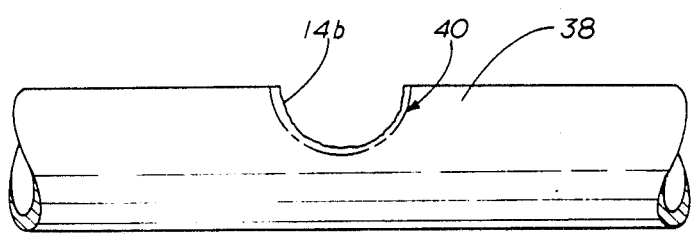
FIG. 9 is an isometric view of the header pipe after the header pipe has been cut.
Figure 10:
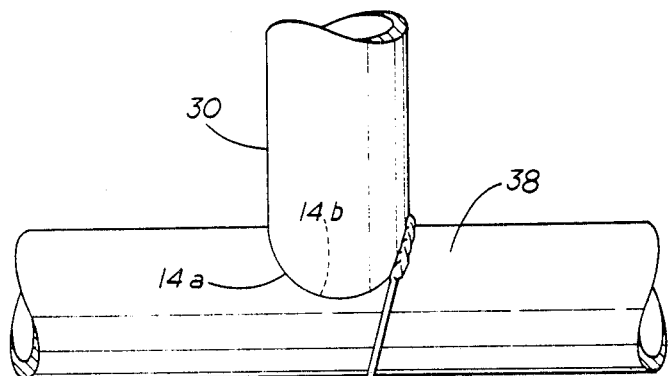
FIG. 10 is an isometric view of the branch pipe positioned onto the header pipe and being welded in place.
Figure 11:
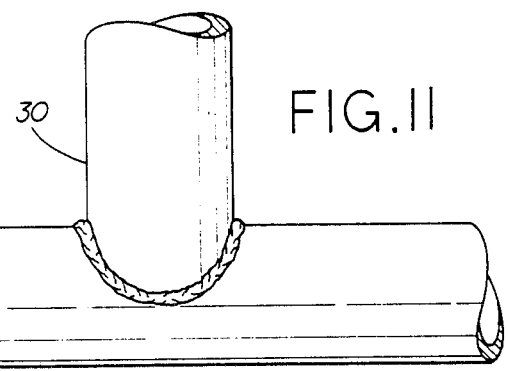
FIG. 11 is an isometric view of the finished T section which can be made from templates made from the present invention.

The branch pipe 30 can now be used as a template itself to be placed on a header pipe 38 and a chalk line 40 drawn to indicate the cut line for the header pipe as illustrated in FIG. 7. The header pipe 38 is then cut along the chalk line 40 leaving a contour surface 14b as illustrated in FIGS. 8 and 9. The branch pipe 30 is then placed onto the header pipe 38 such that the contour surface 14a of the header pipe 38 fits flush with the contour surface 14b of the branch pipe 30. The branch pipe 30 is then welded onto the header pipe 38 as illustrated in FIGS. 10 and 11.

The template 10 may of course be made of various diameters in accordance with the diameter of the branch pipe 30 about which the template 10 is disposed, and may be made of any desirable length and incorporate more or less numbers of alignment holes 18 and thumb screws 22 and 24.

By way of illustration, the preferred embodiment depicted the first contour end 14 to be so configured so as to make a saddle cut on the respective branch pipe 30 so that the branch pipe 30 and the header pipe 38 will form a T section. The second contour end 16 of the template 10 could be so configured that the cut along the branch pipe 39 would be made in such a way that it could be positioned on the header pipe 38 at any desired angle ranging from 0 degrees to 90 degrees. Contour cuts are used when branch pipes are added on to existing header pipes. In other circumstances where pipes need to bend or curve, miter cuts are necessary. Miter cuts are also necessary when it is necessary to weld a pipe onto a flat surface such as a plate or an I-beam. It is obvious that separate templates for al pipe sizes may be preferred as described herein and that the same effective results may be obtained.

Thus, a new, novel and unobvious template has been described not heretofore produced by the prior art which is simple, light weight and superior to and eliminates the standard method of measuring, marking and laying out cut lines thus saving considerable time.

Figure 12:
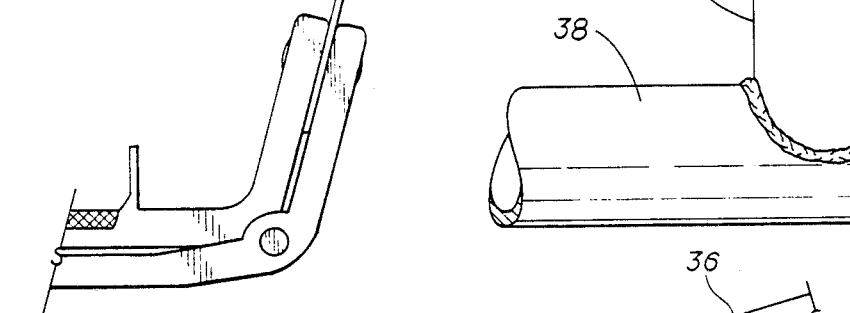
FIG. 12 is an isometric view of a plate template according to the present invention placed on a work piece to be cut.
Figure 12:
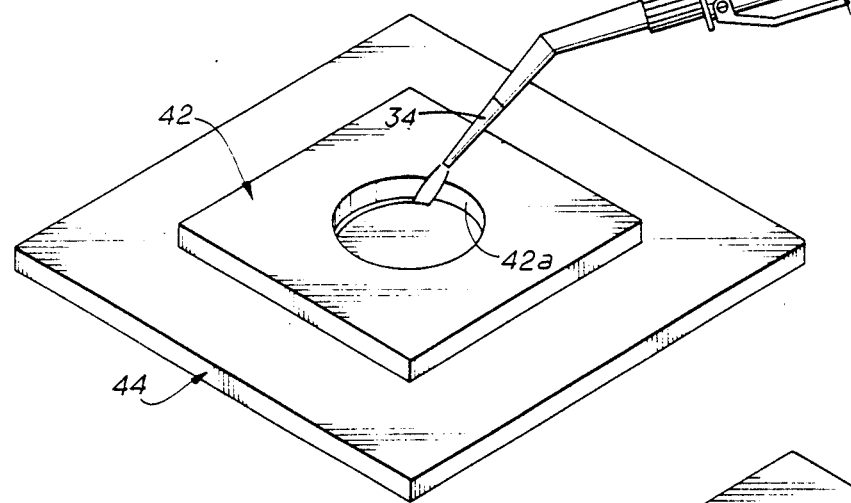
Figure 13:
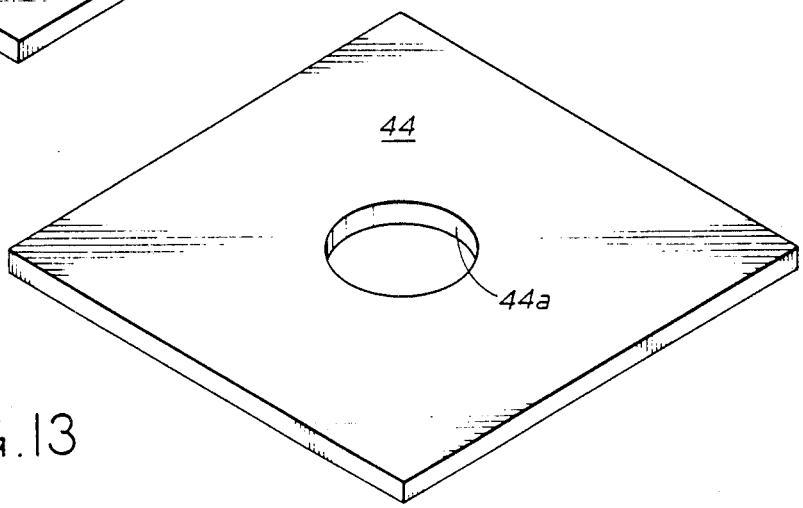
FIG. 13 is an isometric view of the workpiece of FIG. 12 after it is cut using the template of the present invention.

While the foregoing description of the preferred embodiment of the invention has been described in terms of a pipe template, it would be apparent to one of ordinary skill in the art that the present invention could likewise be applied to numerous other areas including templates for cutting pipes for structural use, plates, tubing, bar stock, etc. For example, referring to FIGS. 12 and 13, a template 42, constructed in any configuration, shown here as a simple circle, could be placed on a workpiece 44 and used as a guide for the oxygen cutting torch 36 so that after the cutting torch has cut around the contour 42a, a similar contour 44a is cut out of the workpiece 44 in the same shape as the contour 42a of the template 42.

Consequently, the foregoing description is not to be interpreted in a limiting manner. To the contrary, the present invention is to be limited only by the scope of the following claims.

I claim:

1. A reusable template for cutting contours on pipe with an oxygen cutting torch, said template including in combination
    an elongated, ferrous, rigid sleeve having a first contoured end, a second contoured end, and a plurality of threaded holes, said sleeve having an alloy element selected from the group consisting of carbon over 0.25%, manganese over 14% with over 1.5% carbon, chromium over 12%, nickel over 18% with 8% carbon, molybdenum over 10%, tungsten over 12%, copper over 2%, and aluminum over 10%, and
    a plurality of alignment holes along a plane extending from the longitudinal axis of said sleeve.

2. A reusable template for cutting contours on pipe with an oxygen cutting torch, said template including in combination
    an elonated, ferrous, rigid sleeve having a first contoured end, a second contoured end, a plurality of threaded holes, and a plurality of threaded members positioned in said plurality of threaded holes whereby said template may be fixedly positioned on said pipe, said sleeve having an alloy element selected from the group consisting of carbon over 0.25% manganese over 14% with over 1.5% carbon, chromium over 12%, nickel over 18% with 8% carbon, molybdenum over 10%, tungsten over 12%, copper over 2%, and aluminum over 10%, and
    a plurality of alignment holes along a plane extending from the longitudinal axis of said sleeve.

* * * * *